No. 5,512. J. POREE. FILTER. PATENTED APR. 18, 1848.

No. 5,512. J. POREE. FILTER. PATENTED APR. 18, 1848.

J. POREE.
FILTER.

PATENTED APR. 18, 1848.

PATENTED APR. 18, 1848.

J. POREE.
FILTER.

Fig. 17. Bis.

No. 5,512.

J. POREE.
FILTER.

PATENTED APR. 18, 1848.

Fig. 18. Bis.

UNITED STATES PATENT OFFICE.

JULES POREÉ, OF NEW ORLEANS, LOUISIANA.

FILTER.

Specification of Letters Patent No. 5,512, dated April 18, 1848.

*To all whom it may concern:*

Be it known that I, JULES POREÉ, of the city of New Orleans, State of Louisiana, have invented a new and Improved Mode in the Process of Filtering Water and other Liquids.

The nature of my invention consists in the mode of effecting in the manner the most easy, the most efficacious, and on the most extensive scale, the clarification of water and analogous liquids.

To enable others skilled in the art to make and use my invention I will proceed to describe its principle, its construction and operation.

The theory of the system of filtration to which this invention applies consists in the combination of the following principle. First: In employing as a filtering medium none but inert substances, that is to say, which exert no chemical action on water, as sand or pounded free stone grit. Second: In retaining and compressing these substances in a close vessel so as to form separate and compact beds or masses to each of which the water may be conducted in either the upper or underside alternately or on both sides at once at pleasure. Third: Employing pressure to any extent in order to render the filtration more rapid, which pressure may be produced either by a column of water pressing upon the filtering substances or by means of a pump worked by any suitable power. Fourth: The employment according to circumstances of one or more beds of filtering materials all concurring in the same operation. Fifth: The cleansing of the filter without its being necessary to take it to pieces or relaying the filtering materials. Sixth: The application of the hydrostatic law by which fluids rise to their level to the elevation of the filtered water to a height exceeding that of the filtering vessel. Such are the principles apart from which I contend that no effectual filtration can be carried on, on a large scale. To effect the perfect clarification of thick or troubled water as for instance river water holding in suspension a certain quantity of foreign substances which impair its natural transparency, it is requisite to sift it as it were or to cause it to traverse a mass more or less thick of solid molecules each distinct and separate but so small and so closely pressed one against the other that there exists only irregular capillary passages between them extremely narrow, permeable only to water, and stopping the passage of all substances which are mixed with it however minute they may be. From this it will be seen that the clarification of water by filtration is simply a mechanical operation. It is of importance that it should retain this character, and therefore that no substance should be employed which might impair the chemical purity of the water. It is easy to form and to maintain a bed of filtering materials when the water to be filtered is brought to the surface without pressure, but it is not so when the water is driven with considerable force. Then it becomes difficult to prevent the small grains of sand or free-stone from being carried forward by the water, whereby the mass loses its consistency and finally becomes completely broken up. The ruling principle and that which alone renders the application of the others possible and effective, therefore is that of retaining and compressing the filtering materials. This principle is the foundation of the system and the system must fall if the foundation fails. But this was not the only difficulty. After discovering the means of preventing the filtering materials being carried away by the force constantly acting with a tendency to produce that effect, it still remained to simplify the apparatus, to render it easy to work and to put together and to take asunder, durable in all its parts and incorruptible in all its materials. These points I have likewise attained, and the filter is as easy of regulation as the most simple machines which have ever been employed in manufactures. The turning of a few screws suffices either to take the parts asunder or to reunite them so solidly that nothing can derange them.

*Description of the apparatus.*

The close vessel in which the filtration is effected may be of various forms and dimensions. It may be made of wood, of stone, of iron or copper, &c. I therefore wish it to be understood that in the following description I do not confine myself to either the forms, dimensions, or materials therein set forth as they may be altered or modified according to circumstances. I prefer however the cylindrical and cubic or rectangular forms, and also cast iron for the material. It will likewise be readily understood that although for simplicity of description and to avoid repetitions I speak of water only, yet that my remarks apply equally to all analogous liquids.

*The cylindrical apparatus. Fig. 2 a back elevation showing the pipes and cocks.

Note that where any part occurs in several figures it is denoted by the same letters in all of them.

The case or vessel is of cast iron. It is four feet high by four feet in diameter and from five eighths to six eighths of an inch in thickness. The vessel might be formed of as many lengths as there are to be beds of filtering materials, the lengths being united in any convenient manner. But it is preferable on many accounts to divide it from top to bottom into two equal parts. The advantages of this method will presently be seen.

Figure 1:
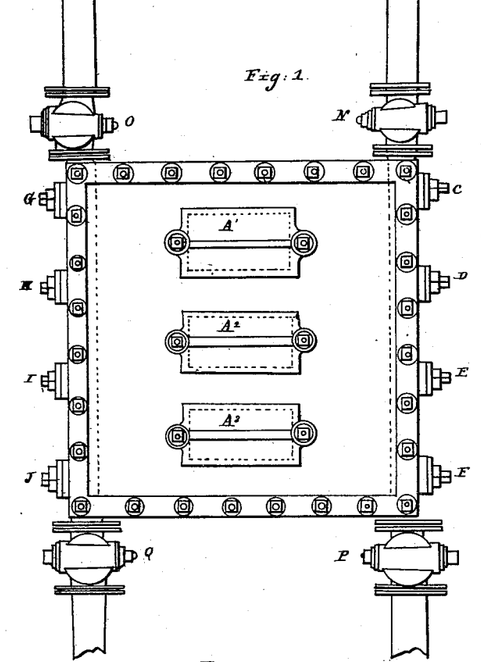
*—Figure 1, is a front elevation or that side which contains the doors.
Figure 3:
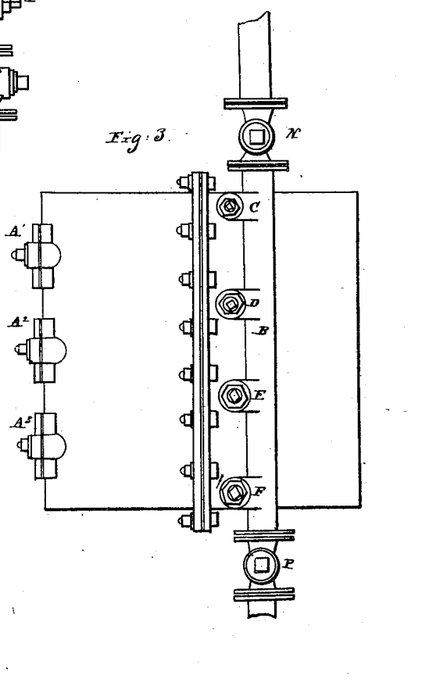
Fig. 3 a side elevation showing the flanches, and Fig. 4 a plan of one of the bottoms.
Figure 4:
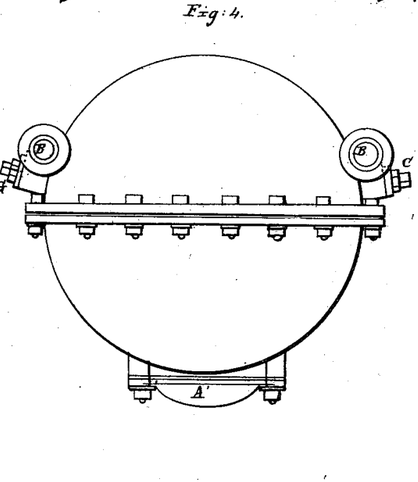
Figure 5:
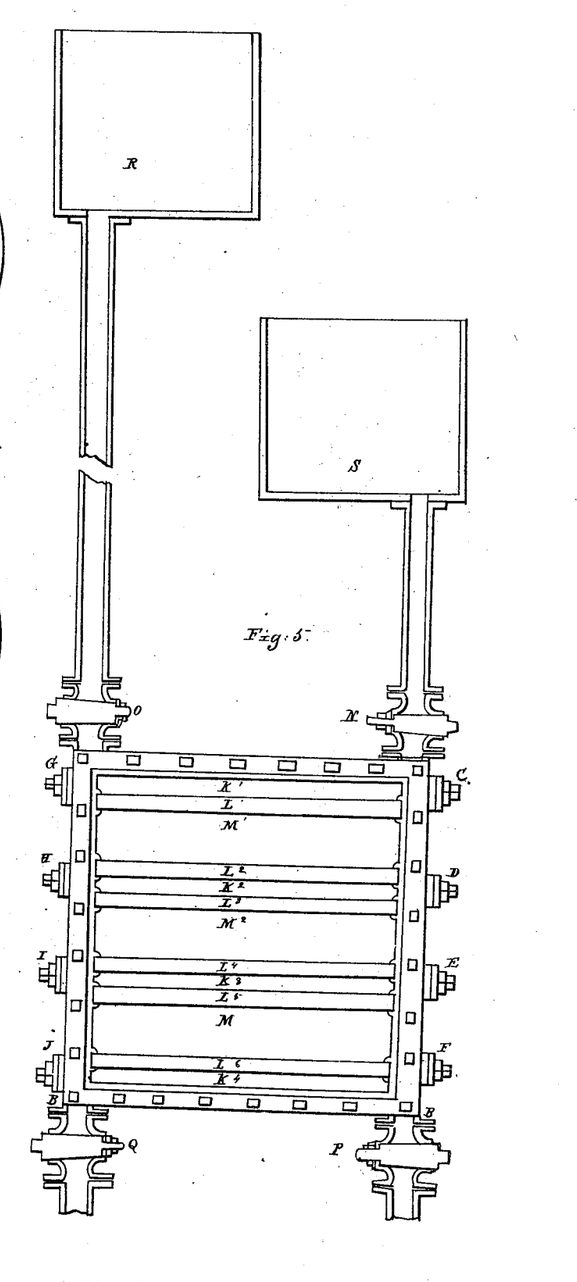

Fig. 5 is a vertical section through the axis, showing also parts of the reservoirs and of the side pipes in section. Around each portion extends a flange pierced at equal distances with square holes to receive the screw bolts by which the two parts are united together. The front half has three apertures A' A² A³ corresponding exactly with the three beds of filtering materials before spoken of. Upon the back half two tubes B B are cast extending from the top to the bottom of the vessel and as close as may be to the flanges. The internal diameter of these tubes is about three inches, and they communicate with the interior of the vessel by means of the cocks C D E F G H I J placed horizontally. Each half of the vessel is cast with a top and bottom. The interior of the vessel is arranged as follows: Beginning at the upper part immediately beneath the top is a hollow space K' about two inches and a half high communicating with the two external side pipes B B by two cocks C G of two inches diameter nearly diametrically opposite to each other. This space I call vestibule. Beneath this vestibule is placed a false bottom or disk L' about two inches thick which I call the retaining shelf or box. It is constructed as hereinafter described and fixed in a groove cast in and extending around the side of the vessel or formed by two small edges cast upon the vessels or fastened to it. This shelf constitutes the ceiling or top of a chamber M' eight inches high corresponding with the first door A' of the vessel and intended to receive a compact mass of sand of a certain fineness. A second shelf L² exactly like the first forms the bottom of this chamber.

Descending toward the bottom of the vessel beneath the second shelf is seen a second vestibule K² communicating in like manner as the first with the pipes B B by the cocks D H; then a third shelf L³ and a second chamber M² intended to receive a mass of sand somewhat finer than that in the first chamber; then follows a fourth shelf L⁴ and a third vestibule K³ communicating with the pipes B B by the cocks E I; then a fifth shelf L⁵ and a third chamber M³ to contain a mass of broken freestone of great fineness; then a sixth shelf L⁶ and lastly a fourth vestibule K⁴ communicating with the pipes B B by the cocks F J, the bottom of which vestibule is formed by the bottom of the vessel. Thus the vessel contains—First: Four vestibules each fitted with two cocks to admit and discharge the water. Secondly: Six false bottoms or retaining boxes or shelves fixed in circular grooves; and thirdly: Three chambers for holding the filtering materials, and each having a door outside of the same height as the chamber. There should likewise be four other cocks N O P Q one at each end of the side pipes B B to which they are connected by flanges and bolts so as to be readily united or detached. Lastly: All the metallic portions of the apparatus which may require it should be protected as far as possible from oxidation by timing, by galvanization, by electrogalvanism, by painting or any other suitable means for effecting the object.

The apparatus thus described is arranged for filtering downward, but it is equally adapted to filtering upward. All that is necessary being to change the order of the filtering masses, placing the coarsest in the lower filtering chamber and the finer at the upper filtering chamber.

Figure 6:
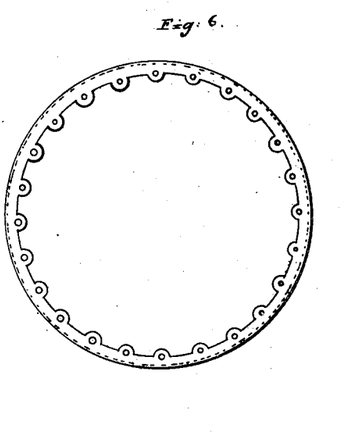
Figure 7:
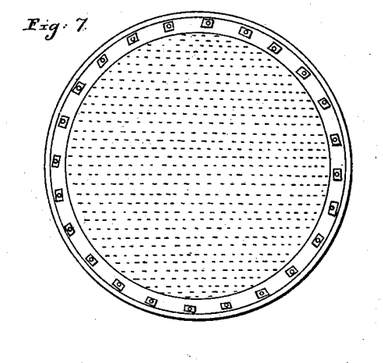
Figure 8:
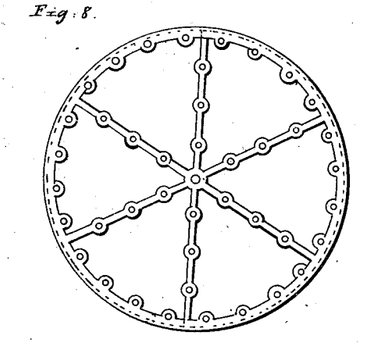
Figure 9:
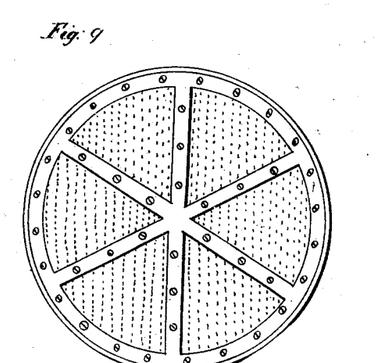

The shelves or retaining boxes are constructed as follows: A hoop of cast iron of about two inches in depth (Fig. 6) is united to a metallic bottom (preferably of sheet iron galvanized) which is pierced with a great number of very small holes. The shelf is filled with sand coarser than the filtering materials and very closely packed and covered with a metal plate similar to the bottom plate. Taking care that the holes in these plates are of smaller diameter than the sand in the boxes. These plates are fastened to the hoop by screws. (See Fig. 7.) A shelf thus constructed will serve for an apparatus of small diameter or exposed to little pressure, but for large diameters or great pressure it is necessary, in order to obtain sufficient strength that the plates should be supported by a frame or grating attached to the hoop, or that the interior of the hoop should be divided with compartments (see Figs. 8 and 9) or the two plans may be combined.

The utmost care should be given to the perfect execution of these shelves, as the perfect action of the filter depends upon them; and I believe that no substitute could be found for them. In fact it will be seen that although it is impossible to retain the fine sand which is required for the perfect clarification of the water merely by plates of metal pierced with holes however fine they may be, it is not impossible, nay it is easy by these same plates to retain sand of six times the diameter and consequently from one hundred to two hundred times larger in volume. It will be understood likewise that in opposing to the extremity fine molecules of sand or free stone composing the filtering materials a thickness of two inches of sand which although coarser is very much compressed, it must be impossible for these molecules to force a passage through such an obstacle which only offers irregular and winding capillary passages continually intercepted, one while enlarging, then contracting, taking all forms and changing with the contact of every two grains of sand. These boxes thus resolve and in the most satisfactory manner the difficult problem of retaining and compressing the filtering materials, and combined with the division of the vessel and the grooves in which they are fixed they give to the apparatus a degree of perfection never before attained—it is simple and solid; it is now composed of but a small number of parts easy to take to pieces and to put together again without causing waste or wear.

If thick or muddy water such as river water is generally were turned directly on to a mass of filtering materials composed of the finest molecules and consequently very compact, there can be no doubt that this mass would become choked up in a short time; that the filtration would soon stop, and that the apparatus would require cleansing many times a day. Doubtless also a single bed of materials of only eight inches in depth (which depth should not be exceeded on account of facility of cleansing which is indispensable) having to sustain the whole pressure the more minute particles of dirt would at length force a passage through it and consequently that the water would remain more or less thick. Hence the necessity of affording to the matters held in suspension by the water the space requisite for their deposit; hence consequently the introduction of several filtering masses composed of sand or freestone which are finer in proportion as they are placed lower down in the apparatus if the filtration is effected downword, or the reverse if the filtration is effected by the ascent of the water. I have fixed the number of these masses at three, experience having proved to me that this number is sufficient, but there is nothing to prevent a fourth or even a greater number in those exceptional cases in which the water is very turbid. On the other hand only two or even one mass may be employed if the water contains but a small portion of foreign matter or if as in many cases in manufactures it is not required that the clarification of the water should be carried out to the utmost extent.

Lastly the setting up of the apparatus is an extremely simple operation, as it consists merely in placing the false bottoms or shelves complete in themselves in the grooves of the vessel and in connecting the two portions of the vessel together by means of screwed bolts.

To charge the vessel with the filtering materials, the sand or freestone is introduced by the openings or doorways in thin successive strata, taking care to wet them slightly and to compress them firmly so as to form a kind of artificial porous stone. The vessel is then connected to the pipes by which the foul water enters and by which the clear water escapes, and it can then be set instantly in operation by opening the four cocks O G F N. (Fig. 5.) The water from the reservoir R enters the upper vestibule K' by the cock G; under pressure traverses the three filtering masses, leaves its impurities therein and runs off clear at the cock F to pass into the cistern or receiving vessel S through the cock N.

An apparatus thus constructed will act for a long time without being taken asunder and without the least derangement. As to the quantity of water which it will furnish, it is difficult to fix it exactly as circumstances vary so greatly. The quantity will always depend upon the extent of the surface and upon the permeability of the filtering masses; upon the greater or less impurity of the water brought on to these masses, and likewise upon the pressure employed; always bearing in mind that when it is required that the filtered water should rise to a given height above the apparatus, that this column balances a corresponding column of dirty water and consequently reduces the pressure to that which results from the difference in the height of the two columns.

*Rectangular apparatus.*—The description of the details of construction of a cylindrical filter will apply equally for the most part to a rectangular one, it will therefore be sufficient for me to observe that this latter offers many and important advantages over the former, which it is well to bear in mind in many cases and of which the following are the chief: First: Great economy and simplification in the construction since all the pieces which form the six sides of the vessel are planes and can be cast separately and fitted together without difficulty. Secondly: A great facility in the placing the retaining boxes in the grooves, in the putting together and disconnecting all the parts of the filter by means of flanges and nuts and screws, in the removal from one place to another in consequence of the small space occupied by the apparatus when taken to pieces. Thirdly:

The increase of filtering surface and consequently of the product in filtered water in the proportion of more than 25 per cent. without its being necessary for that effect in a large filtering establishment, to occupy a greater surface of ground as a cylindrical filter of a certain diameter occupies as much space as a square filter whose side is equal to such diameter. Fourthly: The means of increasing the size of the filters more than is possible with filtering apparatus of a cylindrical form and thence effecting a reduction in the number of filters when a given quantity of filtered surface is required and a reduction in the expense of keeping in order and working.

Figure 11:
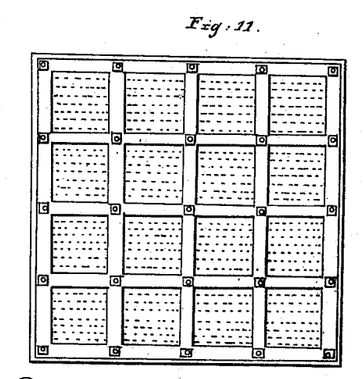

In a large filtering establishment two filtering vessels may be placed back to back as it were which then form one vessel separated into two departments by a cast iron plate. With respect to the retaining boxes they must be made on the same principles but square as shown in Figs. 10 and 11.

*Cleansing the filters.*—It is a certain fact that no filtration on a large scale is possible unless we have the means of cleansing the filters without taking them to pieces and without manipulating the filtering materials. To effect the cleansing I act on each filtering bed separately. Now to effect the cleansing of the first filtering bed. I shut all the cocks of the filtering vessel and the cock N Fig. 5 through which the filtered water passes away after filtration, then I open the cock P and the cocks H and C. The water then ascends through the filtering bed from below that is to say in the direction contrary to that which it follows during filtration. It is from this point that I start to effect the cleansing movement. By means of the quadruple key hereafter described fitting on the heads of the four cocks H C G D one man can turn or work these cocks simultaneously first one way then another in such a manner that by the first movement the cocks H and C shut, and G and D open, at the next movement G and D shut and H and C open. This movement I make once or more times, thus: H C, one; G D, two; H C, one; G D, two; and then for a short interval of time allow the water and dirt it contains to pass away by the cocks C and P. In this operation the filtering bed acted upon is rapidly traversed by two strong currents in opposite directions, whose meeting has the effect of producing shocks and agitation which detach from the filtering material the filthy matter which adheres to it and rejects such filth out of the filter. This cleansing up and down movement is repeated during four or five minutes, but care must be taken not to keep the cocks G and D too long open at a time as that would have the effect of forcing the filth which it is intended to remove deeper into the filtering bed. After having cleansed the first filtering bed I pass to the second bed working the cocks I D H E and then to the third bed working the cocks J E I F. The whole time thus occupied in cleansing a filter with three filtering beds is about 15 to 20 minutes. As I have thus shown the cleansing by the means of dirty water is effected without any difficulty but it has the inconvenience of soiling the filtering material from below that is to say in a contrary direction to that of filtration, whence it follows that on renewing the filtration it is necessary to allow the water to run to waste for a moment until it passes clear. It would be much more advantageous to effect the cleaning with filtered water provided it did not interrupt the working nor require a new pressure from any source, nor cause the filtered water to return.

Having given my attention and researches to this important part of the art of filtration as well as to the others I have succeeded in overcoming the difficulty in the simplest manner whenever there are several filters together in operation and that the filtered water is raised to an upper level. It suffices in such a situation to shut the cock O which allows the communication of the filter to be cleansed with the pipe bringing the dirty water and to keep the cock N which allows its communication with the filtered water, open. It is then evident that a part of the filtered water supplied by the filters in operation will enter the filter to be cleansed under the effect of the first pressure or of the column of dirty water and may be made use of in the same way as the column of dirty water, care being taken to keep open the cock Q situated on the side opposite to that by which the filtered water enters, and the cock P shut. By these means any filter may be cleansed without interrupting the filtration in any way. The same operation may be effected even when the filtered water is not raised above the filters by means of pipes and stop cocks by which the filtered water as it comes from other filters is stopped and forced into the filter requiring to be washed.

Figures 14, 15:
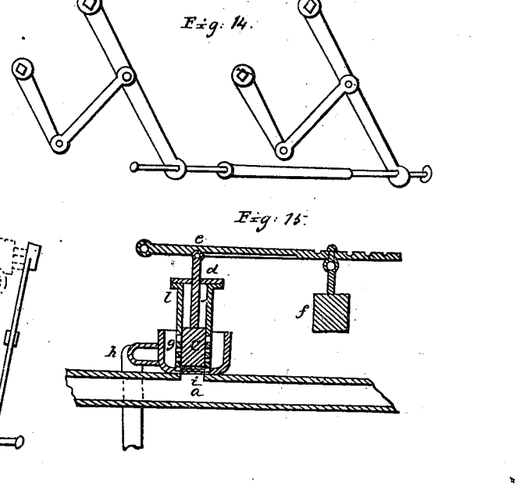

The quadruple key before mentioned is composed of four distinct keys Figs. 12, 13 and 14, connected together two by two by joined rods which are also connected together by another rod or handle intended to receive the movement and communicate it simultaneously to them. By means of this instrument one man is enabled to effect the cleaning. The operation is rendered quite regular—there is no cause to fear any false movement or any shocks given improperly not that one cock should be opened when it ought to shut or shut when it ought to open. In short a common workman without any acquaintance with the subject or previous apprenticeship is in a situation to manage 30 filters and keep them perfectly cleansed.

*On the direct application of pressure derived from any motive power to filters— The means of regulating such pressure and of increasing or diminishing it at pleasure.*—In all cases where circumstances will admit of it, it is doubtless best to effect the filtration by means of the pressure produced by a column of water more or less elevated and weighing upon the filtering materials, and consequently to employ the motive power at command to produce such column of water in case it does not exist naturally. In this case the pressure is always uniform and when once the vessels are made of the strength requisite to sustain the pressure, no accident need be apprehended whatever, may be the resistance opposed by the filtering materials to the passage of the water according as they may be more or less compact or more or less blocked up by the impurities. But if on the contrary the water to be filtered is forced directly through the filters, as it is impossible to regulate the action of the pump with such precision as that it shall in all cases deliver only the exact quantity of water which the filters can pass, it will necessarily happen that when the quantity of water supplied by the pump is too great it will either force a passage carrying along with it a portion of the impurities and thus render the operation ineffecual, or else the vessel, the pipes, or some other parts of the apparatus will at length give way, perhaps burst with great force and cause serious accidents. Let it be supposed for example that each stroke of the piston furnishes 100 gallons of water if in the same space of time filters can only discharge 99 gallons, it is clear that in the course of a very few strokes one or other of the aforesaid events must take place. I have remedied this danger by a safety valve constructed as follows:

Fig. 15 represents a vertical section of the valve. To the pipe *a*, which receives the water from the pump and conducts it to the filters I attach the vertical pipe *b*, bored perfectly true and smooth inside to receive the piston *c*.

The piston is connected by the rod *d*, to graduated lever *e*, furnished with a movable weight *f*, like a steelyard.

In the tube *b* are a series of holes around which is placed a cup *g*, from which branches a tube *h* connected to the reservoir which supplies the pump. In its ordinary position the piston rests upon the internal ring *i*, placed at the bottom of the tube *b*, at its junction with the horizontal pipe which conducts the water. Before setting the filters to work the pressure at which they are to work is regulated by means of the weighed lever. When this pressure is exceeded that is when the pump throws a greater quantity of water than the filters can discharge, it will be seen that the piston will gradually rise and will furnish an issue to the excess by opening in succession the holes made in the sides of the vertical tube in which it moves. On the other hand the workman set to watch the apparatus will be warned by the return of the water to the reservoir and can diminish the force of the machine without however its being absolutely necessary. By this means the employment of any motive power to produce pressure directly, is rendered both possible and easy. The effect of this pressure upon the filters is augmented or diminished at pleasure and all dangers are avoided.

It should here be observed that although all tending to the same end, each apparatus in a large establishment has as one may say its own separate and independent existence; that each can be connected with or detached from the general system, and that consequently there is no room to fear those serious accidents which sometimes disturb or even suspend the operations of important establishments.

Figure 16:
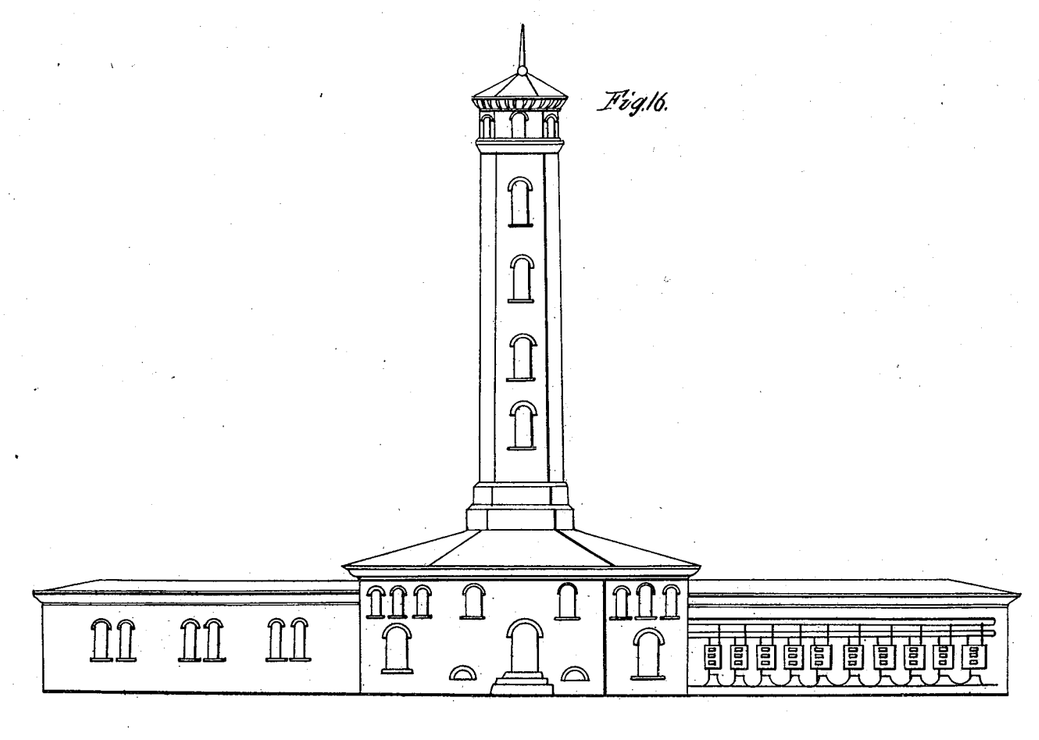
Figure 17:
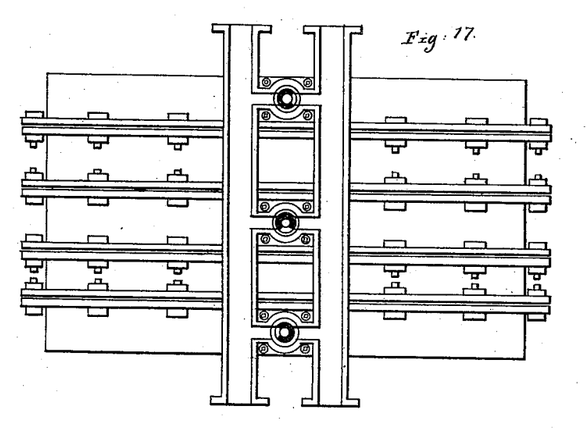

Lastly: To give an idea of a large filtering establishment I have annexed the design Fig. 16 showing a hydraulic tower and a series of twenty filters which series may be extended and mutiplied at pleasure in conforming to the form and convenience afforded by the ground at command. Besides the doors $A^7 A^2 A^3$ that open into the chamber containing the filtering substance there may be other doors that open into the vestibules so that they can be inspected at pleasure.

What I claim as my invention and desire to secure by Letters Patent is—

1. The combination of a series of chambers filled with any suitable material for filtering, with intermediate vestibules combined in an exterior case, so that a communication can be established between each vestibule, and the induction and eduction pipes, as herein described, in combination with the pipes and stop cocks, so that each of the separate chambers can be cleaned substantially in the manner above described.

2. I claim constructing the partitions between the filtering chambers and the spaces or vestibules in the manner set forth by double plates filled with coarse gravel, for the purposes set forth.

New Orleans 26 April 1847.

J. PORÉÉ.

Witnesses:
　ADE Y. CAVELIER,
　TH. GIRARD.